(12) United States Patent
Vela Gonzalez et al.

(10) Patent No.: US 12,296,654 B2
(45) Date of Patent: May 13, 2025

(54) WINDSHIELD RETENTION ASSEMBLY FOR A VEHICLE

(71) Applicant: Honda Motor Co., Ltd., Tokyo (JP)

(72) Inventors: Juan Antonio Vela Gonzalez, Dublin, OH (US); Hirofumi Takemoto, Dublin, OH (US); Sumeet Jain, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 17/933,888

(22) Filed: Sep. 21, 2022

(65) Prior Publication Data

US 2024/0092150 A1    Mar. 21, 2024

(51) Int. Cl.
*B60J 1/02* (2006.01)
*B60J 1/00* (2006.01)
*B62D 65/06* (2006.01)

(52) U.S. Cl.
CPC ............... *B60J 1/006* (2013.01); *B60J 1/007* (2013.01); *B60J 1/02* (2013.01); *B62D 65/06* (2013.01)

(58) Field of Classification Search
CPC ............... B60J 1/02; B60J 1/007; B60J 1/008
USPC .... 296/84.1, 96.21, 210, 146.15; 244/129.3; 52/208, 800.1, 11
See application file for complete search history.

(56) References Cited

U.S. PATENT DOCUMENTS

| | | | | |
|---|---|---|---|---|
| 1,739,726 | A | * | 12/1929 | Marshall ............ B60J 1/04 49/250 |
| 2,043,672 | A | * | 6/1936 | Morrison ............ B60J 1/02 296/96.14 |
| 4,938,521 | A | * | 7/1990 | Kunert ............ B60J 10/70 52/204.597 |
| 5,791,720 | A | * | 8/1998 | Moore ............ B60J 1/06 24/336 |
| 7,147,274 | B2 | | 12/2006 | Yamamoto |
| 7,469,509 | B2 | * | 12/2008 | Cripe ............ E06B 3/5481 296/146.15 |
| 9,033,403 | B2 | | 5/2015 | Renke et al. |
| 9,365,094 | B2 | | 6/2016 | Salamon |
| 9,505,447 | B2 | | 11/2016 | May et al. |
| 10,266,044 | B2 | | 4/2019 | Barnes, Jr. |
| 2005/0121936 | A1 | | 6/2005 | Dean |

FOREIGN PATENT DOCUMENTS

| | | |
|---|---|---|
| FR | 3056544 B1 | 9/2019 |
| KR | 100794036 B1 | 1/2001 |
| KR | 100296607 B1 | 11/2001 |
| KR | 100315359 B1 | 11/2001 |
| KR | 100333871 B1 | 4/2002 |
| KR | 100333872 B1 | 4/2002 |
| KR | 100398553 B1 | 9/2003 |
| KR | 20180129234 A | 12/2018 |

* cited by examiner

*Primary Examiner* — Dennis H Pedder
(74) *Attorney, Agent, or Firm* — Plumsea Law Group, LLC

(57) ABSTRACT

A windshield retention assembly includes a windshield, a windshield retention bracket including a lower bracket portion and a tab extended from the lower bracket portion, and an outer adhesion bead bonding the lower bracket portion to the windshield, wherein the tab is extended beyond an edge of the windshield.

14 Claims, 10 Drawing Sheets

WINDSHIELD RETENTION ASSEMBLY FOR A VEHICLE

BACKGROUND

1. Field of the Disclosure

The present disclosure relates to a windshield retention device.

2. Description of Related Art

Vehicles windshields are typically installed using a urethane sealant applied to a frame of the vehicle, followed by the mounting of the windshield on the frame. In some cases, a rubber weather sealant or molding is applied around an edge of the windshield.

It is desired to improve the windshield mounting to more effectively mitigate an impact of a collision on vehicle passengers and pedestrians.

There is a need in the art for a system and method that improves windshield retention in general, and in the case of a frontal impact more particularly.

SUMMARY OF THE INVENTION

Vehicle safety standards call for retention of various components, e.g., doors, wheels, and windshields, in the case of an impact, such as during crash testing. For example, Federal Motor Vehicle Safety Standard 212-Windshield Mounting has been promulgated to reduce crash injuries by providing for retention of the vehicle windshield during a crash. According to some aspects, a windshield retention bracket that improves retention of a windshield, e.g., during a frontal impact, is disclosed, as well as a method for using such a windshield retention bracket.

In one aspect, the disclosure provides a windshield retention assembly comprising: a windshield; a windshield retention bracket including a lower bracket portion and a tab extended from the lower bracket portion; and an outer adhesion bead bonding the lower bracket portion to the windshield, wherein the tab is extended beyond an edge of the windshield.

In another aspect, a vehicle comprises: a roof panel; a windshield; a windshield retention bracket including a lower bracket portion and a tab extended from the lower bracket portion, wherein the tab is fixed to the roof panel; and an outer adhesion bead bonding the lower bracket portion to the windshield, wherein the tab is extended beyond an edge of the windshield.

A system and method for mounting a windshield on a vehicle is also disclosed, including: providing the windshield; providing a windshield retention bracket; bonding the windshield retention bracket to the windshield to form a windshield retention assembly; and fixing the windshield retention assembly to the vehicle using the windshield retention bracket.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to some aspects, a windshield retention bracket that improves retention of a windshield, for example, during a frontal impact, is disclosed, as well as a method for using such a windshield retention bracket, e.g., in mounting the windshield to a vehicle. According to some aspects, the windshield retention bracket is bonded to the windshield as part of a windshield retention assembly. According to at least one aspect, the windshield retention assembly includes the windshield and the windshield retention bracket, which may be shipped to a manufacturing plant, and then installed on a vehicle. In one aspect, the windshield retention bracket is bolted to a roof panel of the vehicle. According to some aspects, the windshield retention assembly includes an inner urethane bead and an outer urethane bead supporting the windshield.

According to one aspect, the windshield retention assembly includes a windshield retention bracket is bonded into the windshield. According to some aspects, the windshield retention bracket may be formed of a metal, a plastic, a composite, or the like.

According to one aspect, the windshield retention assembly is coupled to a vehicle by fastening the windshield retention bracket onto a roof panel of the vehicle using bolts. According to some aspects, the coupling can be accomplished by replacing or supplementing the bolts by welding, bonding, riveting, etc., the windshield retention assembly to the roof panel using an appropriate connection for the roof panel.

Figure 1:
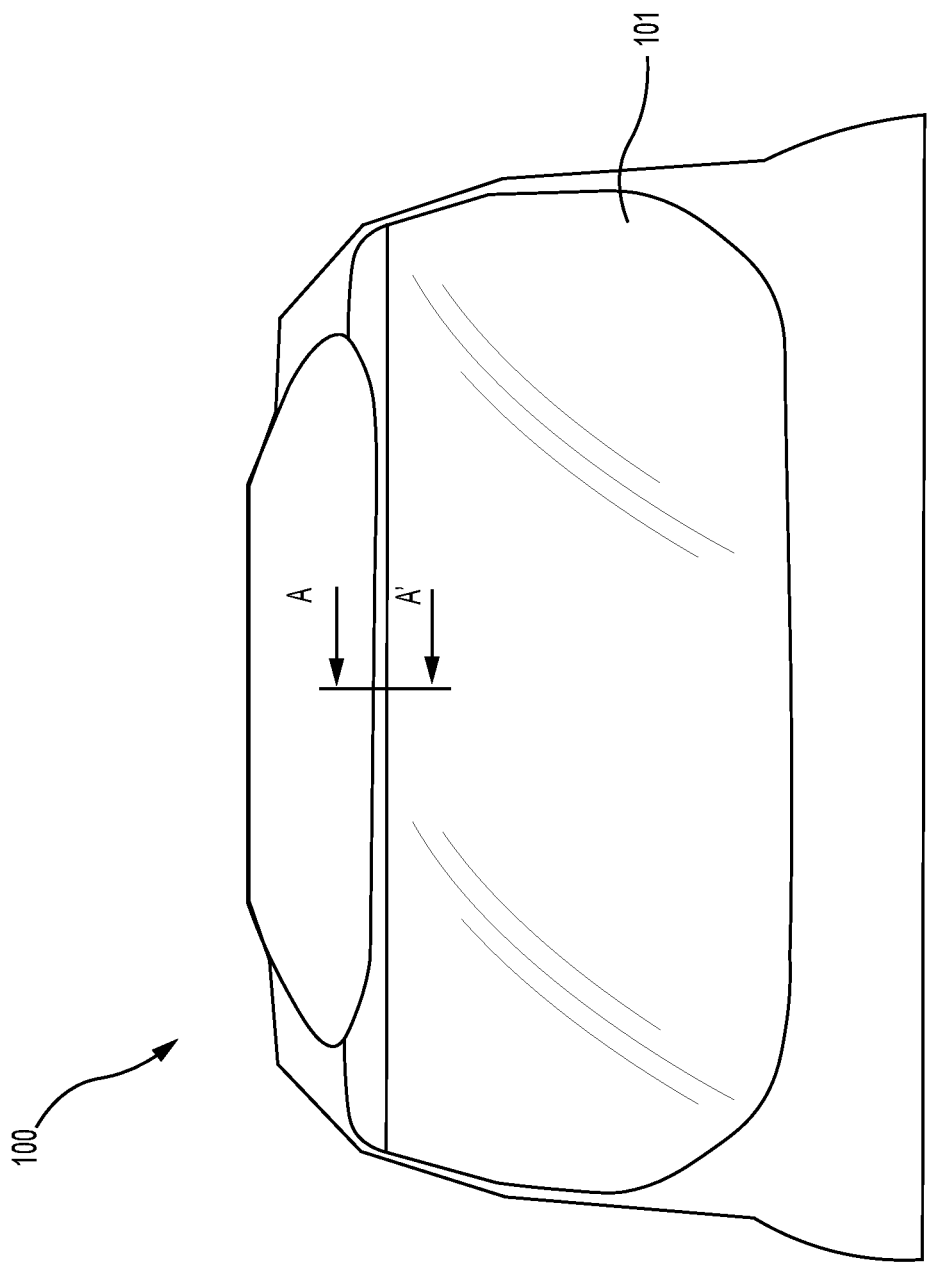
FIG. 1 illustrates an embodiment of a vehicle including a windshield retention assembly.

FIG. 1 illustrates an embodiment of a vehicle 100 including a windshield 101, wherein the windshield 101 is a component of a windshield retention assembly. According to some aspects, the windshield retention assembly includes the windshield 101. According to at least one aspect, the vehicle 100 may be a motor vehicle such as a passenger vehicle, motor home, bus, farm tractor, truck, electric vehicle, electric vertical take-off and landing (eVTOL) vehicle, etc. It should be understood that example vehicles described herein are non-limiting and that the windshield retention assembly may be employed in a variety of different vehicles.

Embodiments of cross-section A-A' in FIG. 1 are illustrated in FIG. 5, FIG. 7, FIG. 8, and FIG. 9. It should be understood that the illustrated cross-sections are non-limiting example embodiments.

Figure 2:
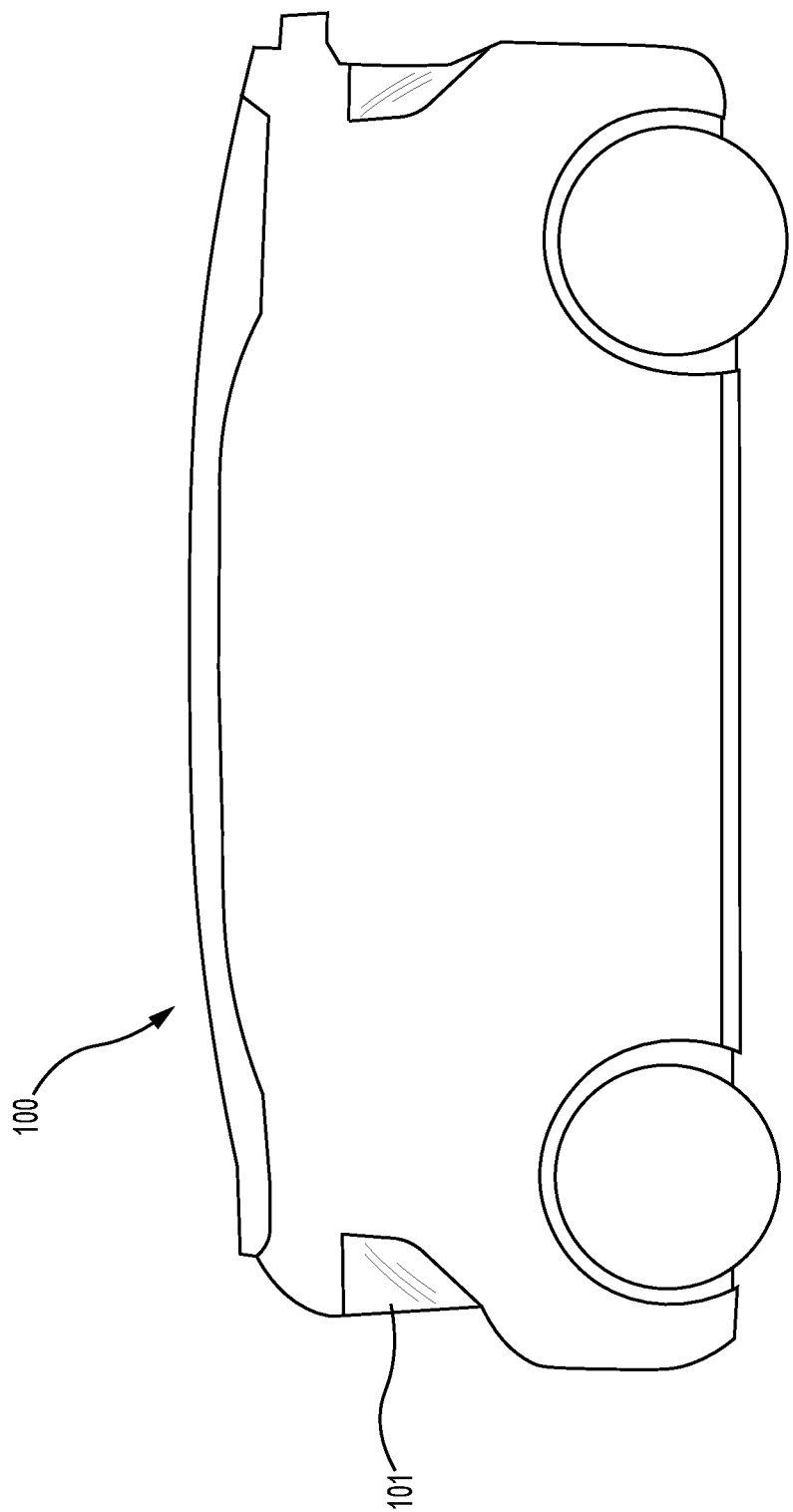
FIG. 2 illustrates an embodiment of a vehicle including a windshield retention assembly.

FIG. 2 illustrates an embodiment of the vehicle 100 including the windshield 101 of the windshield retention assembly. According to some aspects, the windshield 101 may be mounted on the vehicle 100 at an angle between about 60-90 degrees (to normal/horizontal). As illustrated in FIG. 2, the windshield may be mounted on the vehicle 100 at an angle of about 90 degrees to normal (i.e., substantially vertical).

Figure 3:
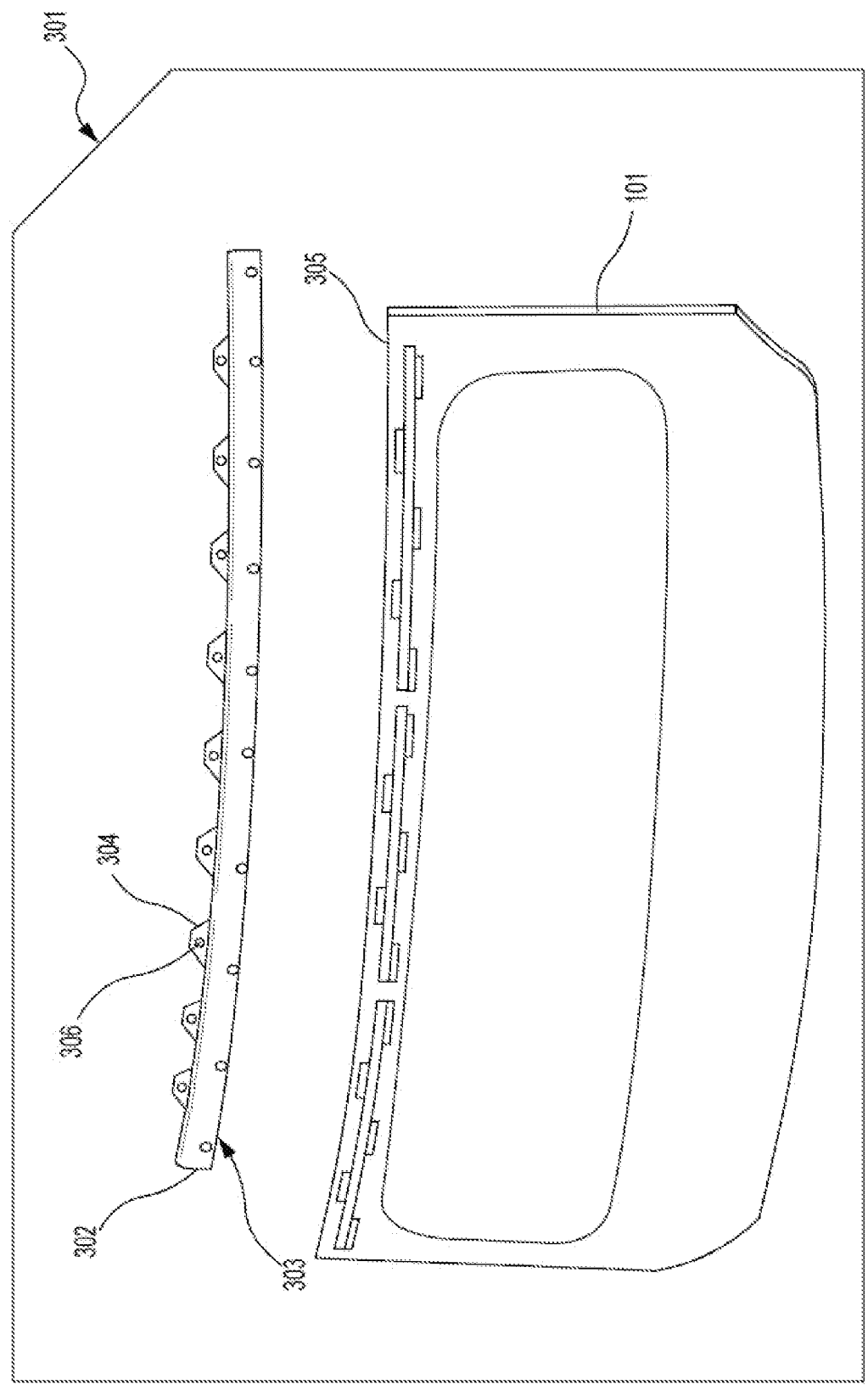
FIG. 3 illustrates an embodiment of a windshield retention assembly.
Figure 4:
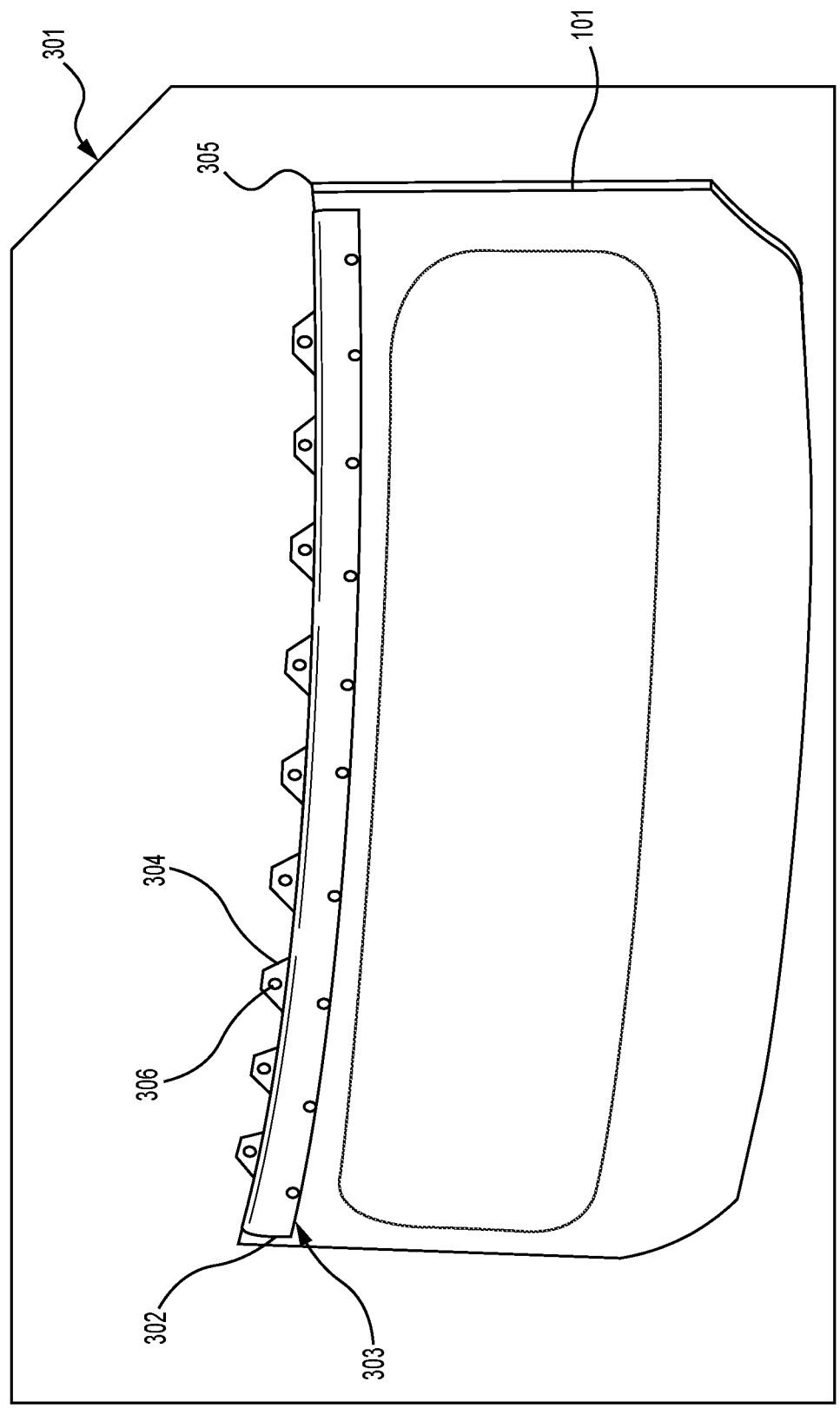
FIG. 4 illustrates an embodiment of a windshield retention assembly.

FIG. 3 and FIG. 4 illustrate embodiments of the windshield retention assembly 301 including the windshield 101 and a windshield retention bracket 302. According to some aspects, the windshield retention bracket 302 may comprise a lower bracket portion 303 and a tab 304. The lower bracket portion 303 may be bonded to the windshield 101. The tab 304 may extend from the lower bracket portion 303 above an edge 305 of the windshield 101 (see also FIG. 5). That is, according to some aspects, the tab 304 may extend beyond an edge of the windshield 101. According to one aspect, the windshield retention bracket 302 may comprise a plurality of tabs, including tab 304. According to at least one aspect, the tab 304 may include a first mounting hole 306 configured to receive a coupling device (not shown), such as a bolt, coupling the windshield retention assembly 301 to the vehicle 100. According to one aspect, the windshield retention assembly 301 is coupled to the vehicle 100 by bolting the tab 304 to a roof panel (not shown) of the vehicle 100. According to one or more aspects, the windshield retention bracket 302 may comprise a second mounting hole (not shown) configured to fix an applique (see element 702 in FIG. 7) to the windshield retention assembly 301 and the vehicle 100.

According to some aspects, the windshield retention assembly improves retention of a windshield in a case where the windshield is mounted on the vehicle 100 at an angle between about 60-90 degrees (to normal/horizontal), where in some cases a lower edge of the windshield no longer aids in retention in the case of a front impact.

Figure 5:
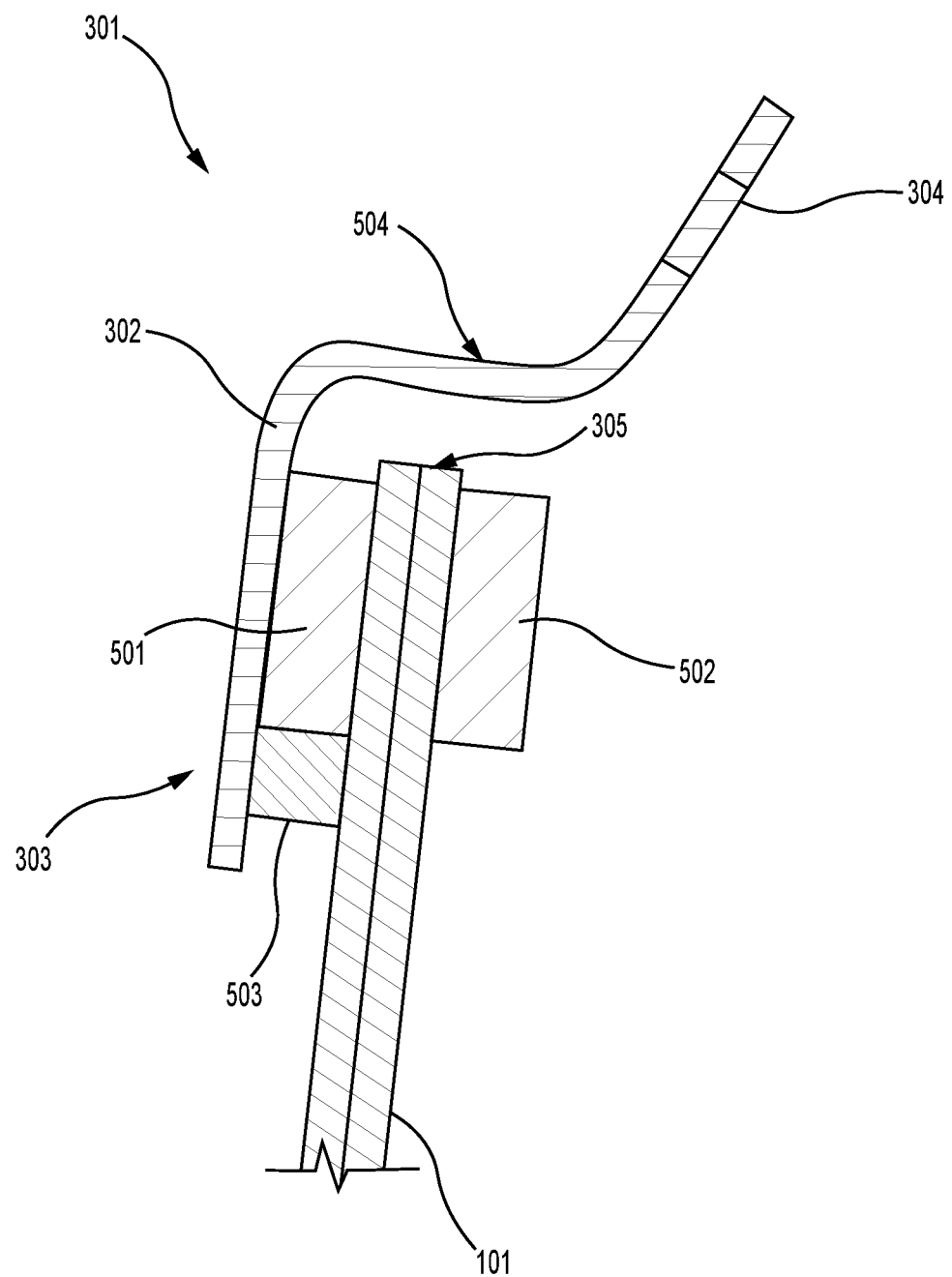
FIG. 5 illustrates an embodiment of a cross-section of the windshield retention assembly.

FIG. 5 illustrates an embodiment of a cross-section of the windshield retention assembly 301. According to some aspects, the windshield retention assembly 301 comprises the windshield 101, an outer adhesion bead 501, and the windshield retention bracket 302 bonded to the windshield 101 by the outer adhesion bead 501. According to some aspects, the windshield retention assembly 301 may be bonded to the roof panel (not shown) by an inner adhesion bead 502. According to at least one aspect, the inner adhesion bead 502 and the outer adhesion bead 501 may be a urethane material. According to some aspects, the inner adhesion bead 502 and the outer adhesion bead 501 may be formed of a silicone-based adhesive, an epoxy-based adhesive, etc.

According to at least one aspect, the lower bracket portion 303 is disposed on a first side of the windshield 101 where the lower bracket portion 303 may be bonded to the windshield 101, and the windshield retention bracket 302 further includes a traversing portion 504 extending from the lower bracket portion 303 on the first side of the windshield 101 to a second side of the windshield 101, wherein the tab 304 may extend from the traversing portion 504 away from the edge 305 of the windshield 101. According to one aspect, the traversing portion 504 is disposed over an edge of the windshield 101.

According to some aspects, the windshield retention assembly 301 comprises an inner seal 503. The inner seal 503 may be formed of a foam material, a rubber material, etc. According to some aspects, the inner seal 503 may function as an initial attachment between the windshield retention bracket 302 and the windshield 101, until a time when the outer adhesion bead 501 has cured. According to some aspects, the inner seal 503 may be omitted, for example, in a case where the windshield 101 is mounted to a vehicle at a manufacturing plant followed by the windshield retention bracket 302. According to one aspect, the inner seal 503 extends between the windshield retention bracket 302 and the windshield 101 along the lower portion of the outer adhesion bead 501.

Figure 6:
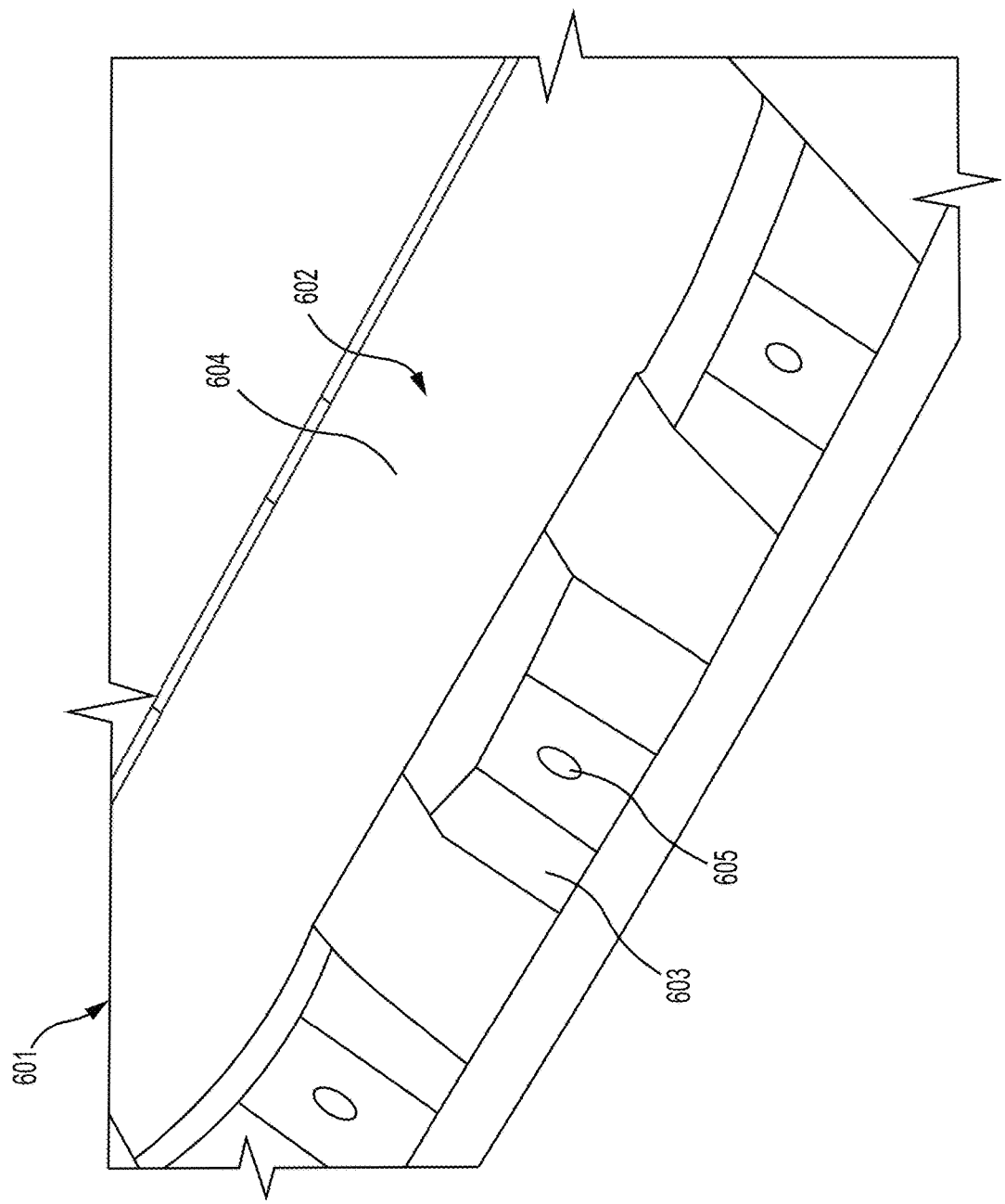
FIG. 6 illustrates an embodiment of a roof panel.

FIG. 6 illustrates an embodiment of a roof panel 601 of the vehicle 100. According to some aspects, the roof panel 601 comprises a top surface 602 and an angled surface 603 extending from the top surface 602. According to one or more aspects, the angled surface 603 extends downward and toward a front of the vehicle 100. The top surface 602 may comprise a first attachment point 604. The angled surface 603 may comprise a second attachment point 605.

According to at least one aspect, the roof panel 601 further comprises a third attachment point, configured to fix or secure the applique 702 (see FIG. 7) to the vehicle 100. According to one aspect, the third attachment point may be disposed on a roof bracket extending from the angled surface 603 of the roof panel 601. According to some aspects, the roof bracket extends upward from the angled surface 603. According to some aspects, a plurality of roof brackets are disposed such that their location alternates with a plurality of second attachment points along an edge of the roof panel 601. According to one aspect, the applique may be engaged with or fixed to the roof bracket by a resilient clip, a rivet, a screw (e.g., from a backside of the roof bracket into the applique), etc.

According to some aspects, the first mounting hole 306 (see FIG. 4) of the tab 304 of the windshield retention assembly 301 aligns with the second attachment point, such that the tab 304 may be fixed to the roof panel 601 using, for example, a bolt or other attachment means (see for example, FIG. 7) passing through the first mounting hole 306 (see FIG. 4) and the second attachment point.

Figure 7:
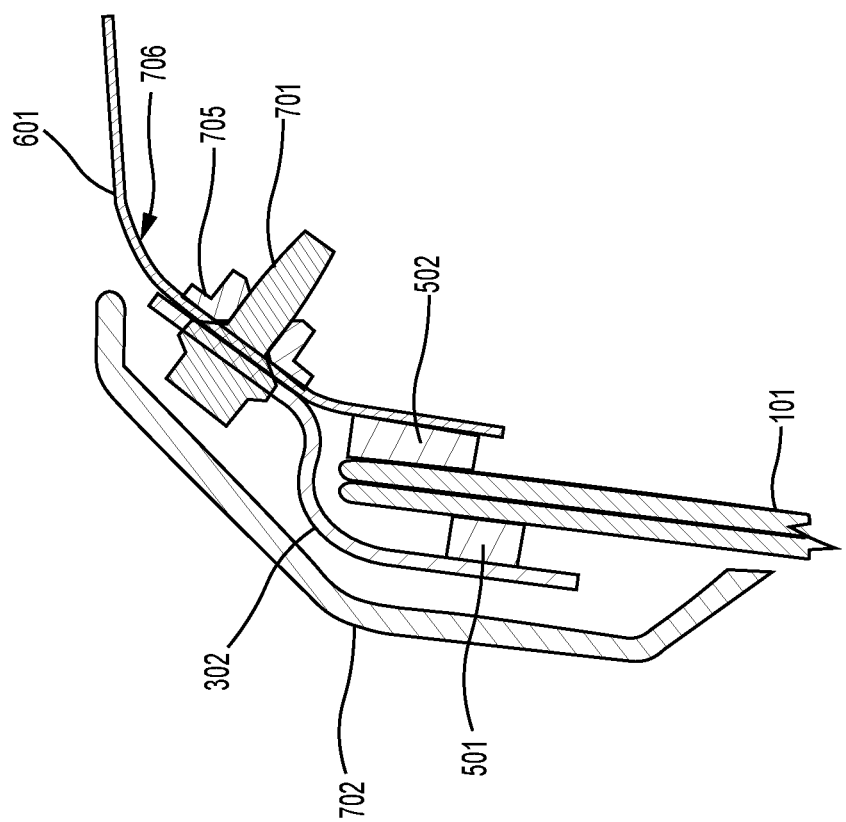
FIG. 7 illustrates an embodiment of a first cross-section of the windshield retention assembly.

FIG. 7 illustrates an embodiment of a first cross-section of the windshield retention assembly 301 taken along A-A' in FIG. 1. According to at least one aspect, the windshield retention assembly 301 comprises the windshield 101, the outer adhesion bead 501, and the windshield retention bracket 302 bonded to the windshield 101 by the outer adhesion bead 501. According to at least one aspect, the tab 304 (see FIG. 4) of the windshield retention assembly 301 aligns with the second attachment point, such that the tab 304 may be fixed to the second attachment point of the roof panel 601 using, for example, a bolt 701 or other attachment means.

According to one aspect, the roof panel 601 may include an interior fastener 705 (e.g., a nut) bonded to an interior surface 706 of the roof panel 601 and configured to receive and engage the bolt 701, securing the windshield retention bracket 302 to the roof panel 601 by means of the tab 304. According to some aspects, the interior fastener 705 may be bonded to the interior surface 706 of the roof panel 601 by, for example, a spot weld, epoxy, press fit into the second attachment point 605, etc.

Figure 8:
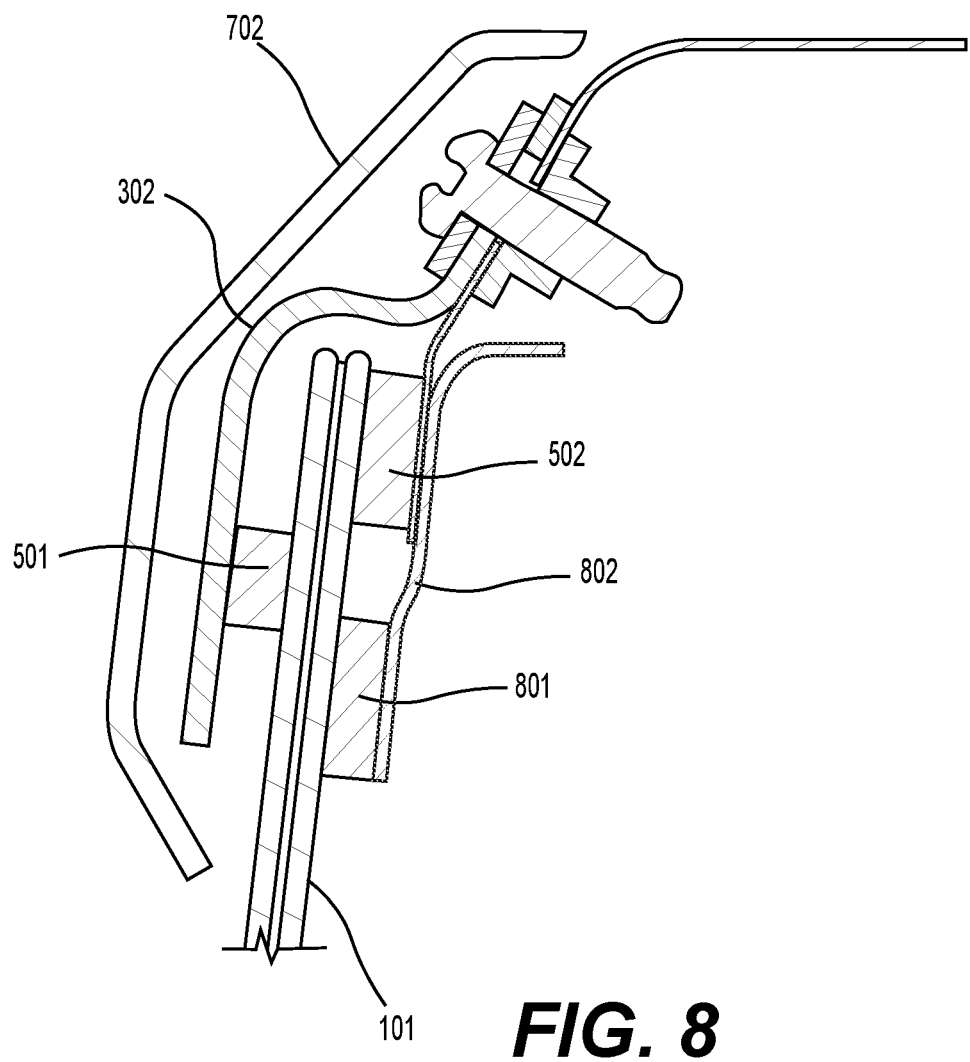
FIG. 8 illustrates an embodiment of a second cross-section of the windshield retention assembly.

FIG. 8 illustrates an embodiment of a second cross-section of the windshield retention assembly 301 taken along A-A' in FIG. 1. According to at least one aspect, the windshield retention assembly 301 comprises the windshield 101, the outer adhesion bead 501, and the windshield retention bracket 302 bonded to the windshield 101 by the outer adhesion bead 501.

According to some aspects, the windshield retention assembly 301 may be bonded to the roof panel 601 by the inner adhesion bead 502 and a second inner adhesion bead 801. According to some aspects, the windshield retention assembly 301 may be bonded to a support structure 802 (e.g., an extension of the roof panel 601) of the vehicle by the second inner adhesion bead 801.

Accordingly, the applique 702 may be attached to the windshield retention bracket 302 by, for example, a resilient material having an adhesive backing on each side contacting the applique 702 and the windshield retention bracket 302, a resilient clip 904 engaged with an edge or opening of the windshield retention bracket 302, etc. According to at least one embodiment, the windshield retention assembly 301 enables at least a 75% retention of a portion of a windshield periphery on each side of the vehicle's longitudinal centerline in a frontal impact at a speed of about 31 miles per hour (MPH) (50 kilometers per hour (KPH)). According to at least one embodiment, the windshield retention assembly 301 enables at least a 50% retention of the portion of the windshield periphery on each side of the vehicle's longitudinal centerline in a frontal impact at a speed of about 31 miles per hour (MPH) (50 kilometers per hour (KPH)).

It should be understood that the windshield retention assembly 301 is not limited to windshield applications and may be employed for other applications. For example, the windshield retention assembly 301 may be employed for retention of a rear facing window in the vehicle.

Figure 9:
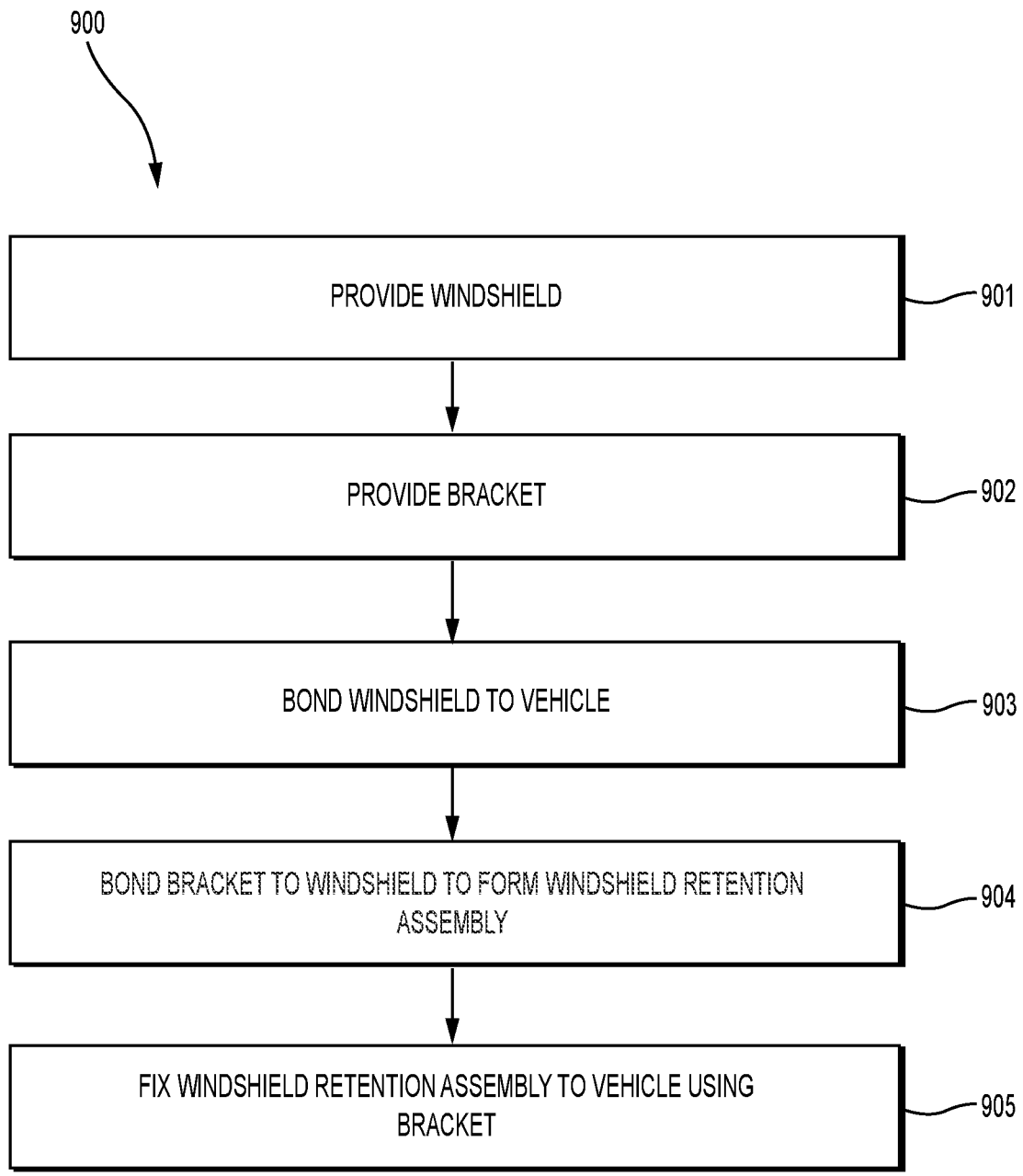
FIG. 9 illustrates an embodiment of a method of mounting a windshield on a vehicle.

FIG. 9 illustrates an embodiment of a method 900 of mounting a windshield on a vehicle. The method 900 includes providing a windshield (step 901) and providing a bracket (step 902). Next, the windshield is bonded to the vehicle (step 903). Once the windshield is bonded to the windshield, the windshield retention bracket is bonded to the windshield to form the windshield retention assembly (step 904). Finally, the windshield retention assembly is fixed to the vehicle using the windshield retention bracket (step 905).

Figure 10:
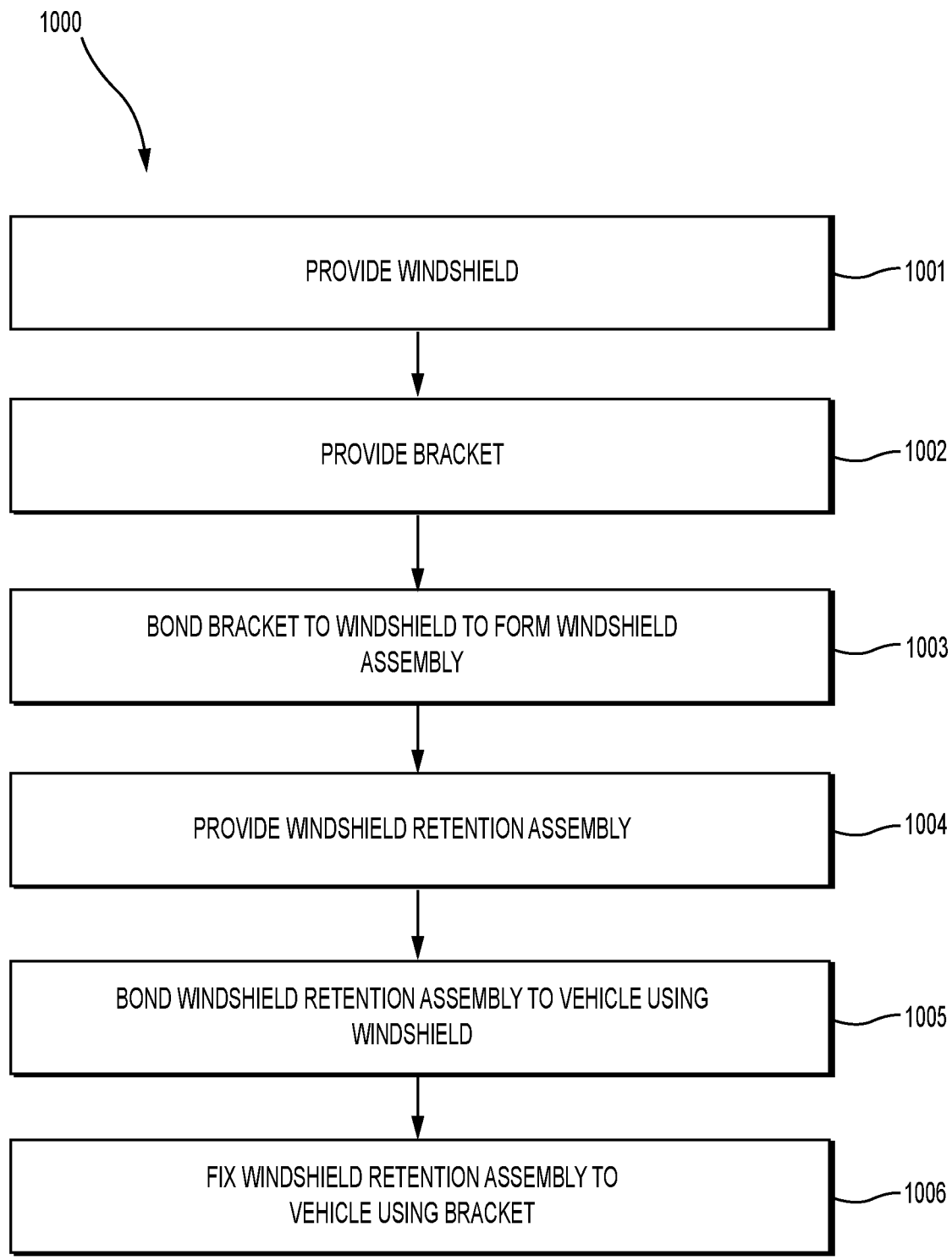
FIG. 10 illustrates another embodiment of a method of mounting a windshield on a vehicle.

FIG. 10 illustrates another embodiment of a method 1000 of mounting a windshield on a vehicle. According to some aspects, the method 1000 of manufacturing the vehicle includes providing a windshield (step 1001), providing a windshield retention bracket (step 1002), and bonding the windshield retention bracket to the windshield (step 1003), for example, by using an adhesive forming the outer adhesion bead 501. According to some aspects, the windshield retention bracket and the windshield, bonded together comprise a windshield retention assembly. According to at least one aspect, the method 1000 further includes providing the windshield retention assembly (step 1004), bonding the windshield retention assembly to the vehicle (step 1005), wherein the windshield may be bonded to the roof panel, and fixing the windshield retention assembly to the vehicle using the windshield retention bracket (step 1006), wherein the tab of the bracket is fixed to the roof panel. According to some aspects, fixing the windshield retention assembly to the vehicle using the windshield retention bracket at step 1006 may include aligning the tab 304 of the windshield retention assembly 301 with the second attachment point 605 of the roof panel 601, such that the tab 304 may be fixed to the second attachment point 605 of the roof panel 601 using, for example, a bolt 701 or other attachment means.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A windshield retention assembly comprising:
a windshield;
a windshield retention bracket including a lower bracket portion and a tab extended from the lower bracket portion; and
an outer adhesion bead bonding the lower bracket portion to the windshield, wherein the tab is extended beyond an edge of the windshield;
wherein the lower bracket portion is bonded to a first side of the windshield and the windshield retention bracket further comprises a traversing portion extending from the lower bracket portion on the first side of the windshield to a second side of the windshield, wherein the tab is extended from the traversing portion away from the edge of the windshield.

2. The windshield retention assembly of claim 1, further comprising a first mounting hole in the tab.

3. The windshield retention assembly of claim 2, wherein the first mounting hole in the tab is aligned to a second attachment point of a roof panel, and the windshield retention assembly is fixed to the roof panel using a bolt passing through the first mounting hole and the second attachment point.

4. A vehicle comprising:
a roof panel;
a windshield;
a windshield retention bracket including a lower bracket portion and a tab extended from the lower bracket portion, wherein the tab is fixed to the roof panel; and
an outer adhesion bead bonding the lower bracket portion to the windshield, wherein the tab is extended beyond an edge of the windshield;
wherein the lower bracket portion is bonded to a first side of the windshield and the windshield retention bracket further comprises a traversing portion extending from the lower bracket portion on the first side of the windshield to a second side of the windshield, wherein the tab is extended from the traversing portion away from the edge of the windshield.

5. The vehicle of claim 4, further comprising an inner adhesion bead bonding the windshield to the roof panel.

6. The vehicle of claim 4, wherein the roof panel includes a top surface and an angled surface extending downward from the top surface, wherein the tab is fixed to the angled surface.

7. The vehicle of claim 4, further comprising a first mounting hole in the tab.

8. The vehicle of claim 7, wherein the first mounting hole in the tab is aligned to a second attachment point of the roof panel, and the windshield retention bracket is fixed to the roof panel using a bolt passing through the first mounting hole and the second attachment point.

9. The vehicle of claim 4, wherein the windshield is mounted on the vehicle at an angle between about 60-90 degrees to normal.

10. The vehicle of claim 4, wherein the windshield is mounted on the vehicle at an angle of about 90 degrees to normal.

11. A method of mounting a windshield on a vehicle comprising:
providing the windshield;
providing a windshield retention bracket;
bonding the windshield retention bracket to the windshield to form a windshield retention assembly; and
fixing the windshield retention assembly to the vehicle using the windshield retention bracket;
wherein the windshield retention bracket includes:
a lower bracket portion that is bonded to a first side of the windshield;
a traversing portion extending from the lower bracket portion on the first side of the windshield to a second side of the windshield; and
a tab extending from the traversing portion away from an edge of the windshield.

12. The method of claim 11, further comprising bonding the windshield retention assembly to the vehicle by an inner adhesion bead between the windshield and a roof panel of the vehicle.

13. The method of claim 12, wherein fixing the windshield retention assembly to the vehicle using the windshield retention bracket comprises:
aligning the tab of the windshield retention bracket with a second attachment point of the roof panel; and
fixing the tab to the second attachment point of the roof panel using a bolt.

14. The method of claim 11, wherein the windshield is mounted on the vehicle at an angle of about 90 degrees to normal.

\* \* \* \* \*